United States Patent
Schmidt

(10) Patent No.: US 7,675,633 B2
(45) Date of Patent: Mar. 9, 2010

(54) METHOD FOR MEASURING POSITIONS OF STRUCTURES ON A SUBSTRATE WITH A COORDINATE MEASURING MACHINE

(75) Inventor: Karl-Heinrich Schmidt, Lohra-Rodenhausen (DE)

(73) Assignee: Vistec Semiconductor Systems GmbH, Weilburg (DE)

(*) Notice: Subject to any disclaimer, the term of this patent is extended or adjusted under 35 U.S.C. 154(b) by 75 days.

(21) Appl. No.: 12/195,568

(22) Filed: Aug. 21, 2008

(65) Prior Publication Data

US 2009/0051936 A1 Feb. 26, 2009

(30) Foreign Application Priority Data

Aug. 23, 2007 (DE) .................. 10 2007 039 983

(51) Int. Cl.
  *G01B 11/14* (2006.01)
(52) U.S. Cl. .................. 356/620; 356/622
(58) Field of Classification Search .......... 356/600–630
  See application file for complete search history.

(56) References Cited

U.S. PATENT DOCUMENTS

| | | | | |
|---|---|---|---|---|
| 5,285,397 A | * | 2/1994 | Heier et al. | 702/167 |
| 5,500,736 A | * | 3/1996 | Koitabashi et al. | 356/620 |
| 6,317,991 B1 | * | 11/2001 | Rinn | 33/1 M |
| 6,549,648 B1 | | 4/2003 | Rinn | |
| 6,747,746 B2 | * | 6/2004 | Chizhov et al. | 356/614 |
| 6,920,249 B2 | | 7/2005 | Rinn et al. | |
| 7,421,060 B2 | * | 9/2008 | Zienert et al. | 378/71 |
| 7,489,407 B2 | * | 2/2009 | Hill et al. | 356/508 |
| 2005/0157296 A1 | | 7/2005 | Hayano | |
| 2009/0024344 A1 | | 1/2009 | Heiden et al. | |

OTHER PUBLICATIONS

Adam, D. et al., "First Measurement Data Obtained on the New Vistec LMS IPRO4," Proc. of SPIE, vol. 6533, 653301, 2007.
Starikov, A. et al., "Accuracy of overlay measurements: tool and mark asymmetry effects," Optical Engineering, vol. 31, No. 6, Jun. 1992, pp. 1298-1310.
Blasing, C., "Pattern Placement Metrology for Mask Making," SEMI, Mar. 31, 1998.

* cited by examiner

*Primary Examiner*—Gregory J Toatley, Jr.
*Assistant Examiner*—Jarreas C Underwood
(74) *Attorney, Agent, or Firm*—Houston Eliseeva LLP

(57) ABSTRACT

A method for measuring structures (3) on a substrate (2) with a coordinate measuring machine (1) is disclosed. A predefined measuring method is used for measuring at least one structure (3) on the substrate (2), wherein the measuring includes the position and/or the width of the structure (3). The predefined measuring method consists of a plurality of processes linked with the coordinate system (1a) of the coordinate measuring machine (2). The measuring method for a substrate is defined by a first orientation with respect to the coordinate system of the coordinate measuring machine (1). The predefined measuring method is applied to a second orientation of the substrate (2).

7 Claims, 5 Drawing Sheets

METHOD FOR MEASURING POSITIONS OF STRUCTURES ON A SUBSTRATE WITH A COORDINATE MEASURING MACHINE

RELATED APPLICATIONS

This application claims priority to German Patent Application No. 10 2007 039 983.0, filed on Aug. 23, 2007, which is incorporated herein by reference in its entirety.

FIELD OF THE INVENTION

The present invention relates to a method for measuring positions of structures on a substrate with a coordinate measuring machine.

BACKGROUND OF THE INVENTION

A coordinate measuring device is well-known from prior art. See, for example, the lecture script "Pattern Placement Metrology for Mask Making" by Dr. Carola Blaesing. The lecture was given on the occasion of the Semicon conference, Education Program, in Geneva on Mar. 31, 1998, and described the coordinate measuring machine in detail. The structure of a coordinate measuring machine, as known, for example, from prior art, is explained in more detail in the following description associated with FIG. 1. A method and a measuring device for determining the position of structures on a substrate are known from the German published application DE 10047211 A1. Details concerning the mentioned position determination may be found in that document.

The unpublished German patent application DE 2007 030 390.6 discloses a coordinate measuring machine having associated therewith means for automatically orienting the substrate. The coordinate measuring machine further has associated therewith a control and computing unit, so that self-calibration may be performed on the basis of at least two different and automatically set orientations of the substrate.

SUMMARY OF THE INVENTION

It is an object of the present invention to provide a method for measuring structures on a substrate adapting the measuring processes for the individual structures depending on the orientation of the substrate.

This object is achieved by a method including the features of claim 1.

It is particularly advantageous if a predefined measuring method is used for measuring at least one structure on a substrate. The measuring includes the position and/or the width of the structure. The predefined measuring method consists of a plurality of processes linked with the coordinate system of the coordinate measuring machine. The measuring method is defined for a substrate in a first original orientation with respect to the coordinate system of the coordinate measuring machine. Also, the deviation of the at least one second orientation of the substrate from the first orientation is determined. The predefined measuring method is rotated corresponding to the deviation of the first orientation from the at least second orientation so that the processes linked with the coordinate system of the coordinate measuring machine are executed corresponding to the second orientation. Linking the plurality of processes with the coordinate system of the coordinate measuring machine means that, based on an original orientation of the coordinate system of the substrate and the CAD data of the substrate, the coordinate measuring machine knows how the individual processes must be designed so that the various positions on the substrate may be approached. If the substrate and thus the coordinate system of the substrate is rotated (setting of a different orientation), the processes must be changed correspondingly so that, on the substrate in the second orientation, the same locations on the substrate may be approached as on the substrate in the first orientation.

The first orientation of the substrate is 0° with respect to the coordinate system of the coordinate measuring machine. Most preferably the at least one second orientation is set automatically. The set orientation of the substrate is determined by detecting special markings and/or structures on the substrate.

The coordinate measuring machine includes a means for automatically orienting the substrate. A control and computing unit is also connected to the coordinate measuring machine so that the various orientations of the substrate may be automatically set and determined.

The coordinate measuring machine includes at least one camera defining a measurement window. There are also provided at least one illumination means and at least one measurement objective defining an optical axis.

A measurement table movable in the X-coordinate direction and in the Y-coordinate direction is provided, with which the structure to be measured may be moved into the optical axis of the camera or the measurement objective so that the structure is within the measurement window.

The predefined measuring method consists of a plurality of processes determining how the measurement table is moved in the X-coordinate direction and/or in the Y-coordinate direction so that the at least one structure to be measured is within the measurement window of the camera. Based on the detected different orientation of the substrate, the predefined processes are changed for the substrate measured in the original orientation such that, on the substrate in the at least one other orientation, the identical structure is measured at the identical location of the structure and with the identical measurement window.

The means for orienting includes an illumination means having associated therewith a camera acquiring an image of the substrate on which the orientation may be determined. The camera comprises an evaluation unit for an identification of the substrate. The identification is applied to a free portion of the surface of the substrate. It is also contemplated that an extra capturing unit for the identification of the substrate may be associated with the means for orienting.

The means for orienting may have associated therewith a computer with the help of which the user may set a given orientation of the substrate. The computer may also be used for image evaluation to evaluate the images of the substrate acquired by the camera and determine the orientation of the substrate based on the evaluation. The computer may also be used to execute a predefined recipe and set given orientations of the substrate.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
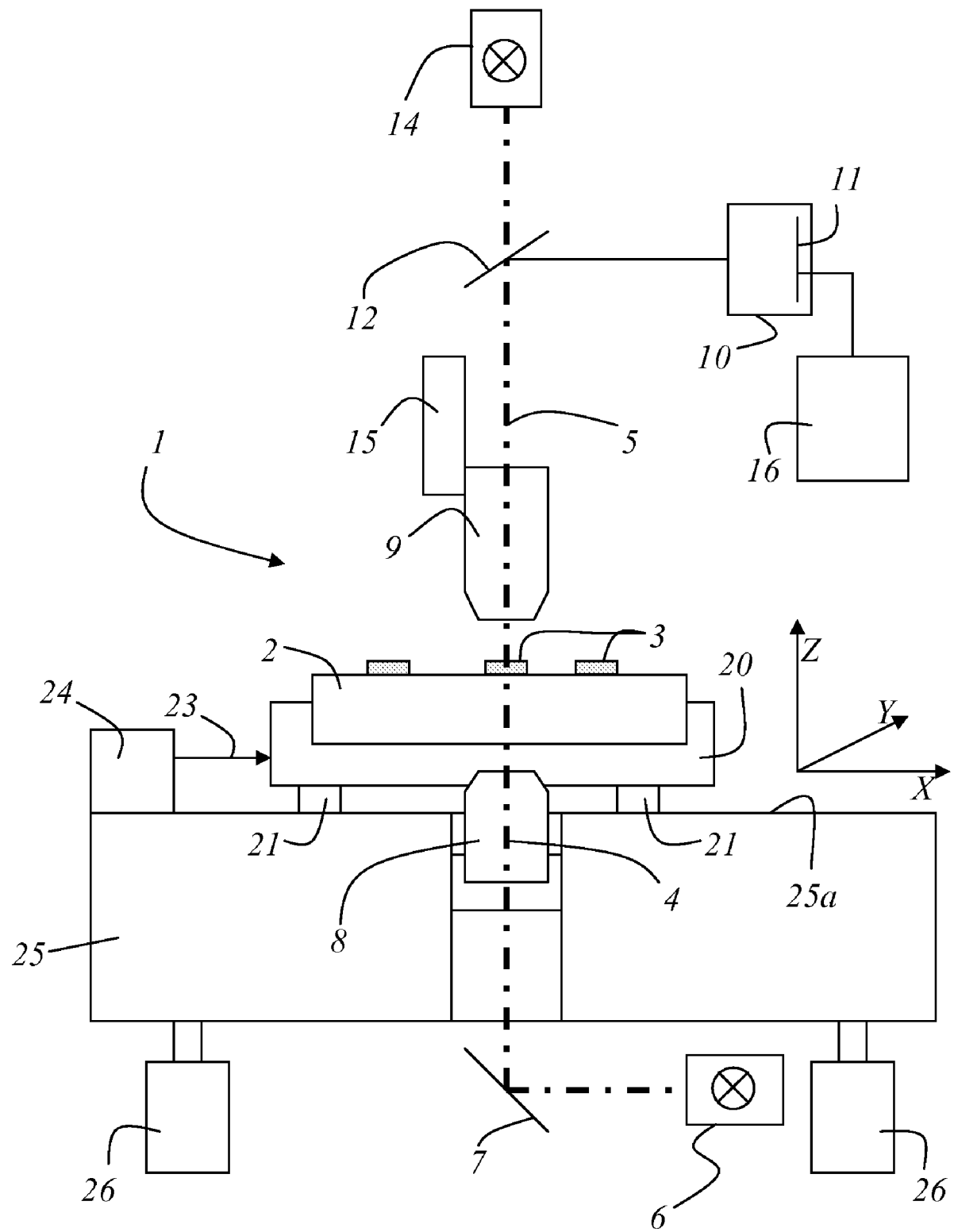
FIG. 1 schematically shows a coordinate measuring device with which the inventive method is executed.

A coordinate measuring device of the type shown in FIG. 1 has been described in detail in prior art and is used for performing the inventive method. The coordinate measuring device 1 includes a measurement table 20 movable in the X-coordinate direction and in the Y-coordinate direction. The measurement table 20 carries a substrate or a mask for the semiconductor production. Several structures 3 are applied to a surface of the substrate 2. The measurement table itself is supported by air bearings 21, which are in turn supported by a block 25. The described air bearings represent one possible embodiment and are not to be considered as limiting the invention. The block 25 may be formed of a granite block. It is clear to someone skilled in the art that the block 25 may be made of any material suitable for forming a plane 25a in which the measurement table 20 moves or is translated. At least one incident light illumination means 14 and/or one transmitted light illumination means 6 are provided for the illumination of the substrate 2. In the embodiment shown, the light of the transmitted light illumination means 6 is launched into the illumination axis 4 for the transmitted light by means of a deflecting mirror 7. The light of the illumination means 6 reaches the substrate 2 via a condenser 8. The light of the incident light illumination means 14 reaches the substrate 2 through the measurement objective 9. The light coming from the substrate 2 is collected by the measurement objective 9 and coupled out of the optical axis 5 by a semi-transparent mirror 12. This measurement light reaches a camera 10 provided with a detector 11. The detector 11 has associated therewith a computing unit 16 with which digital images may be generated from the acquired data.

The position of the measurement table 20 is measured and determined by means of a laser interferometer 24. For this purpose, the laser interferometer 24 emits a measurement light beam 23. Also, the measurement microscope 9 is connected to a displacing means in the Z-coordinate direction so that the measurement objective 9 may be focused on the surface of the substrate 2. The position of the measurement objective 9 may, for example, be measured with a glass scale (not shown). Furthermore, the block 25 is positioned on slabs 26 with an anti-vibration arrangement. This vibration damping is supposed to maximally reduce or eliminate all potential building vibrations and natural vibrations of the coordinate measuring device.

Figure 2:
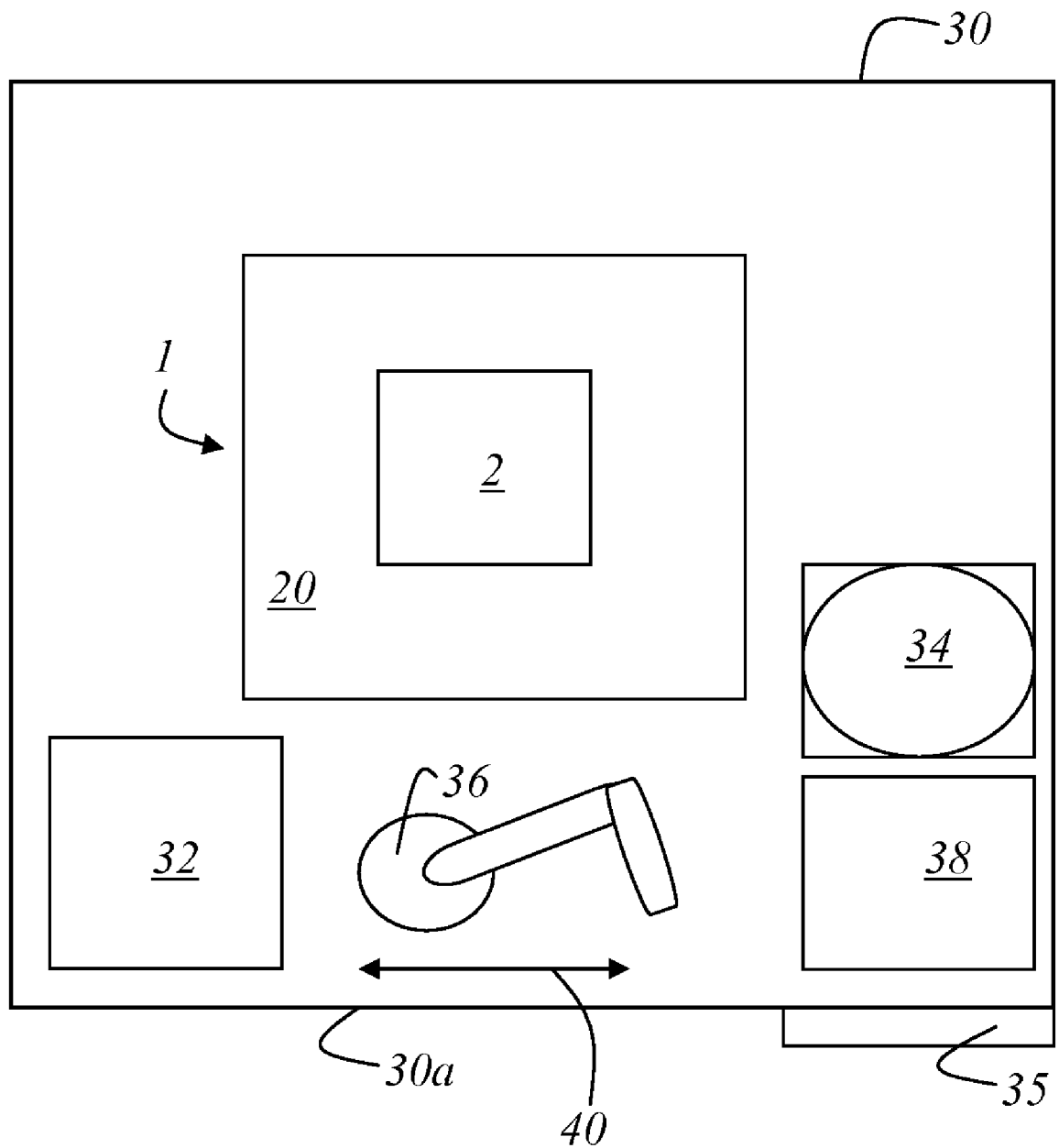
FIG. 2 shows a schematic representation of the device for measuring coordinates of structures on a substrate, wherein all elements and means required for this purpose are arranged in a climatic chamber.

FIG. 2 shows a schematic view of the arrangement of the coordinate measuring device 1 and further means associated with the coordinate measuring device 1 to guarantee efficient examination and measurement of the substrates 2. In the embodiment shown in FIG. 2, the coordinate measuring device 1 is shown in simplified form. In FIG. 2, the coordinate measuring device 1 is represented only by the measurement table 20 and the substrate 2 located on the measurement table 20. The coordinate measuring means 1 is located in a climatic chamber 30 together with other means. In the embodiment shown, the coordinate measuring means 1 has associated therewith a magazine 32 for storing substrates 2 or masks within the climatic chamber 30. A means for orienting 34 the substrates is also arranged in the climatic chamber. A transfer station 35 is provided in a wall 30a of the climatic chamber 30. Furthermore, a transport robot 36 and a further transport means 38 may be provided in the climatic chamber 30. Although a magazine 32 is provided for storing substrates 2 or for temperature adaptation of substrates 2, it is clear to someone skilled in the art that the magazine in the climatic chamber 30 may be omitted. The robot 36 may move along the direction shown by the double arrow 40 in the climatic chamber. The substrates 2 may be introduced into the climatic chamber via the transfer aperture 35. The transport means 38 represents a transfer station. The robot 36 removes the substrate 2 from the transfer station 38 and, depending on the recipe, puts it on the means 35 for orienting, on the measurement table 20 or into the magazine 32.

Figure 3:
FIG. 3 shows a substrate provided with at least one marking for the substrate.

FIG. 3 shows a schematic representation of a substrate 2. The substrate 2 is provided with at least one marking 54, 56 serving for the determination of the orientation of the substrate 2. Without limiting the generality, a first marking 54 is a bar code. A second marking 56 may be an alphanumeric marking of the substrate 2. With the markings 54 and/or 56 it is possible to determine the orientation of the coordinate system 2a of the substrate 2 and thus also the orientation of the substrate 2 itself.

Figure 4:
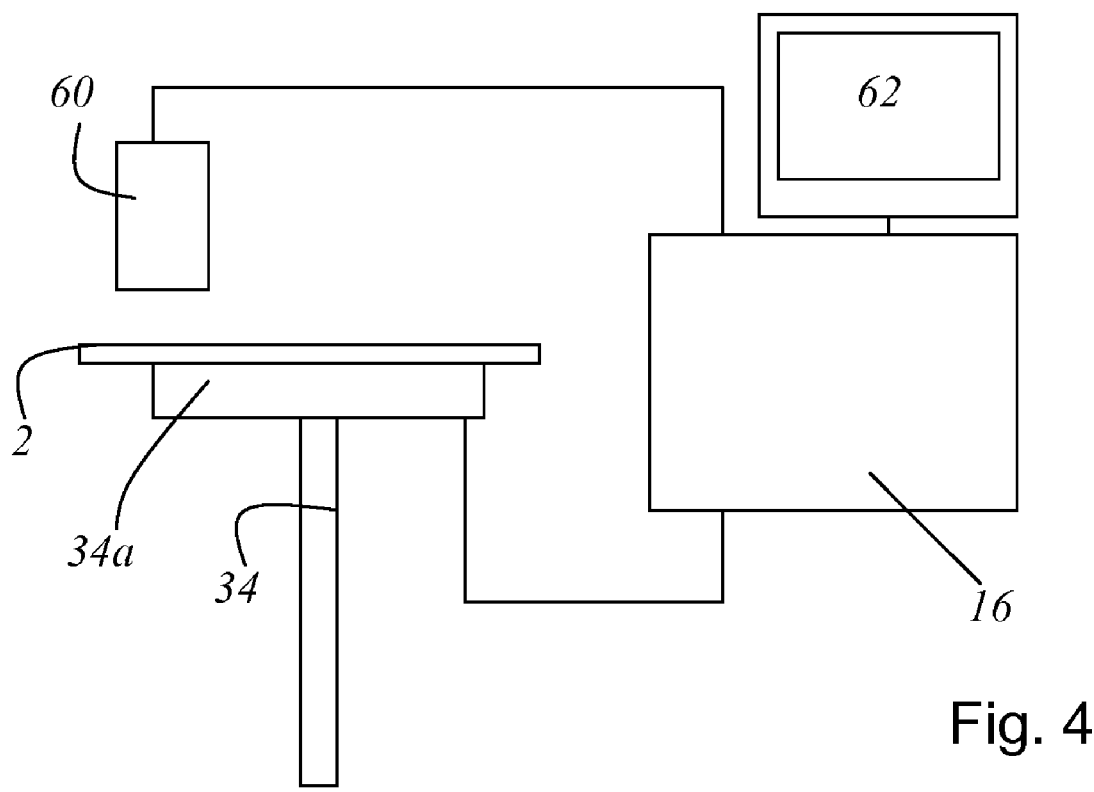
FIG. 4 shows a schematic arrangement of a camera in operating connection with a means for orienting the substrate.

FIG. 4 shows a schematic arrangement of a detection means 60 for the orientation of the substrate 2. The substrate 2 is deposited on the means 34 for orienting the substrate 2. The means 34 for orienting the substrate 2 essentially includes a rotary plate 34a carrying the substrate 2. The means 34 for orienting the substrate 2 is connected to a computing unit 61, with which the orientation of the substrate may be set automatically. Opposite the substrate 2, there is provided a camera 60 with which images of the part of the substrate carrying the markings 54 and 56 may be acquired. It is also contemplated that the whole surface of the substrate 2 may be captured by the camera 60. The orientation of the substrate may then be determined from the image of the surface of the substrate 2 by means of image processing in the computer 61. The current and/or newly set orientation of the substrate 2 may be displayed to the user on a display 62. It is also contemplated that the user may input data concerning the orientation of the substrate via the display 62. A creation of recipes with which predetermined calibration steps may be performed is also input by means of the display and thus conveyed to the computer 61.

Figure 5A:
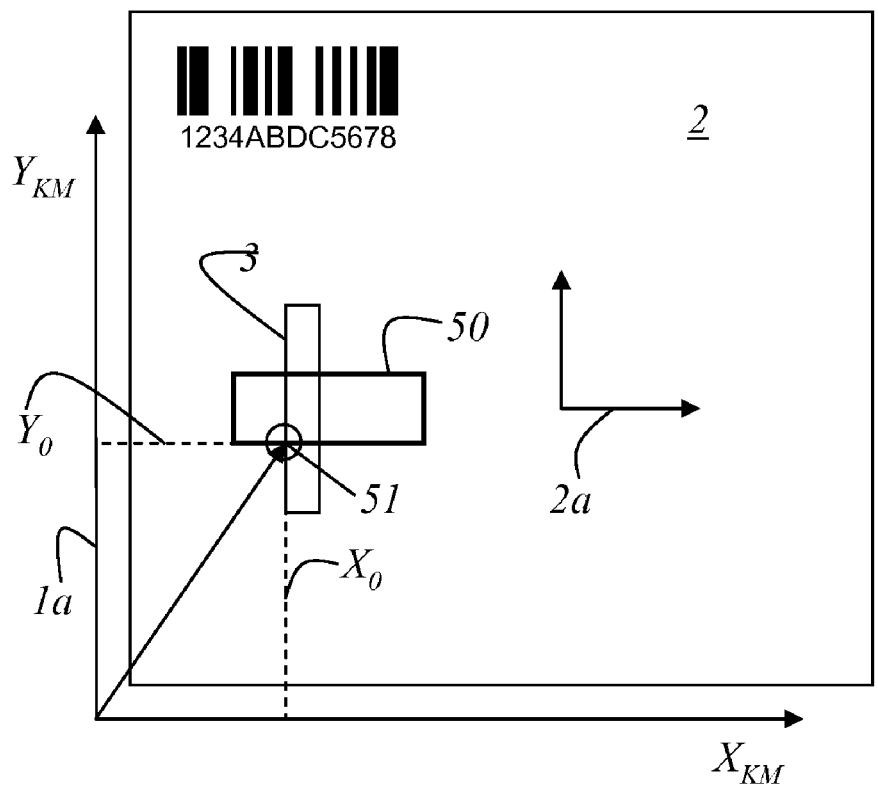
FIG. 5a shows a substrate in the original orientation corresponding to the 0° orientation of the coordinate system of the substrate with respect to the coordinate system of the coordinate measuring machine.

FIG. 5a shows a substrate in the original orientation. The term original orientation means that the coordinate system 2a of the substrate 2 is not rotated with respect to the coordinate system $X_{KM}, Y_{KM}$ of the coordinate measuring machine. The orientation of the substrate 2 with respect to the coordinate system 1a of the coordinate measuring machine 1 is thus 0°. The at least one structure 3 to be measured has the position $X_0, Y_0$ with respect to the coordinate system 1a of the coordinate measuring machine 1. The measurement table 20 must thus be moved a certain distance so that the structure 3 to be measured is in the optical axis of the measurement objective 9. Similarly, the measurement window 50 is then positioned at a certain defined position of the structure 3. The position of the measurement window 50 is indicated by a small circle 51 in FIGS. 5a to 5d.

Figure 5B:
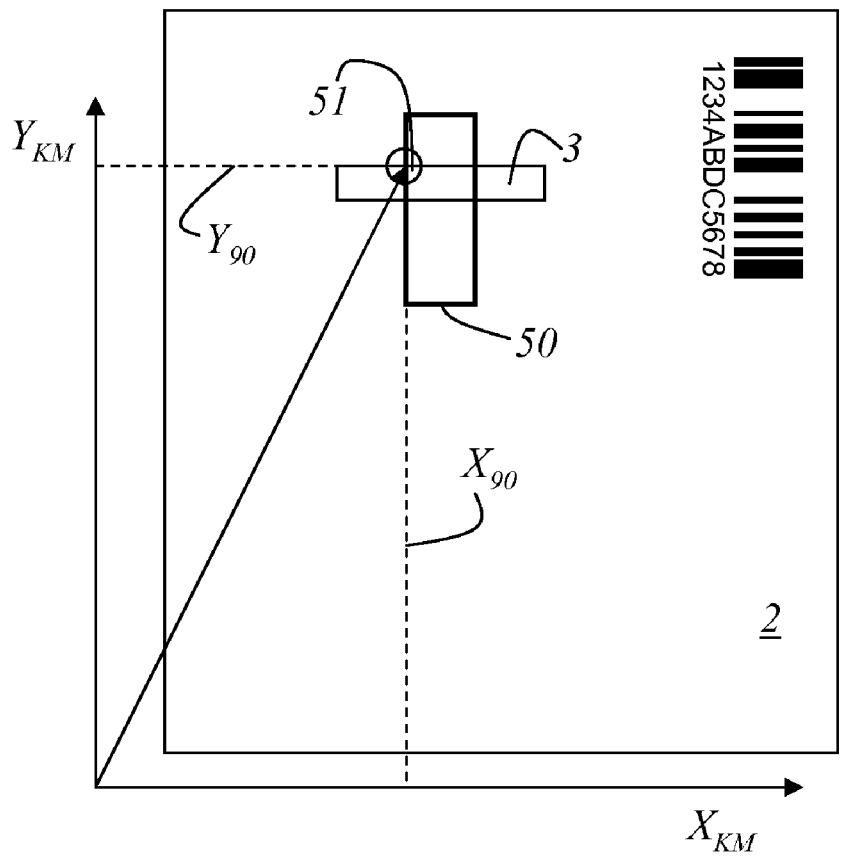
FIG. 5b shows the substrate with a 90° orientation of the coordinate system of the substrate with respect to the coordinate system of the coordinate measuring machine.

FIG. 5b shows the substrate 2 in an orientation rotated by 90° with respect to the coordinate system 1a of the coordinate measuring machine 1. After determining the orientation of the substrate with the help of the marking means 54, 56 on the substrate, the structure 3 to be measured is found in the rotated substrate by means of the components $X_{90}$ and $Y_{90}$. Correspondingly to the rotation of the substrate 2, the measurement window of the camera must also be rotated correspondingly so that the measurement window 50 may also be positioned in the same position 51 of the structure 3 where it was located when the structure 3 was measured in the unrotated substrate 2.

Figure 5C:
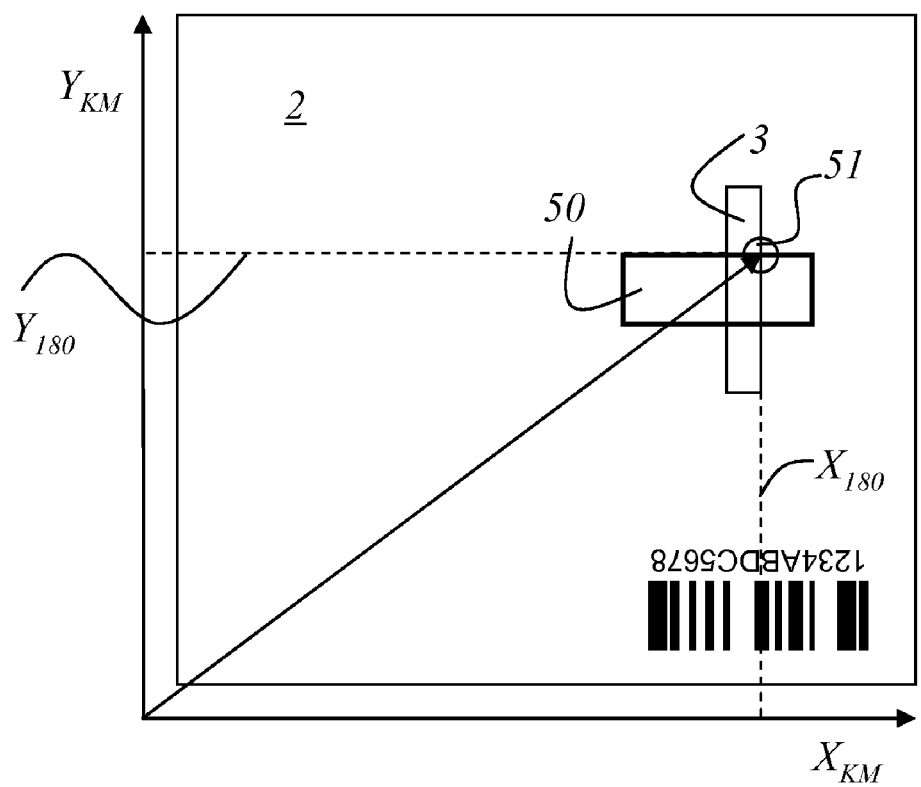
FIG. 5c shows the substrate with a 180° orientation of the coordinate system of the substrate with respect to the coordinate system of the coordinate measuring machine.

FIG. 5c shows the substrate 2 in an orientation of 180° as compared to the illustration in FIG. 5a. The position of the structure 3 to be measured is again found with the help of the components $X_{180}$ and $Y_{180}$ of the coordinate system 1a of the coordinate measuring machine 1. Correspondingly, the measurement window 50 is again rotated so that it is in the same position 51, as performed for the measurement of the structure 3 in the 0° orientation of the substrate 2 and the 90° orientation of the substrate 2.

Figure 5D:
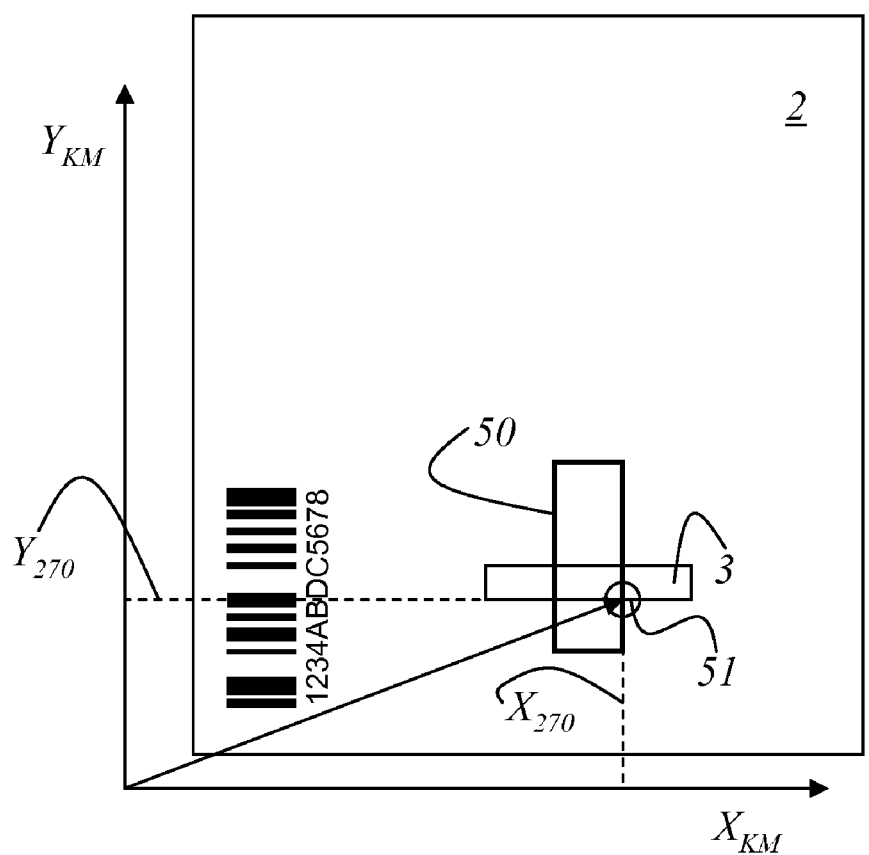
FIG. 5d shows a 270° orientation of the coordinate system of the substrate with respect to the coordinate system of the coordinate measuring machine.

FIG. 5d shows the substrate 2 with an orientation of 270° with respect to the orientation shown in FIG. 5a. The position of the structure 3 on the rotated substrate 2 is again found by means of the components $X_{270}$ and $Y_{270}$ of the coordinate system 1a of the coordinate measuring machine 1. The positioning of the measurement window 50 and the positioning of the measurement table 20 is performed according to the method described in FIGS. 5a, 5b and 5c.

Although the above description preferably described the orientation of the substrate 2 or the rotation of the substrate by 90°, 180° and 270°, it is clear to someone skilled in the art that other orientations may also be automatically set with the coordinate measuring machine. The orientation of the substrate 2 may automatically be determined by the device provided in the coordinate measuring machine 1. Based on the determined orientation, the corresponding processes for measuring the structures 3 on the substrate 2 must then be changed correspondingly to the newly set orientation. This change of the processes is also performed automatically so that a so-called rotated process or rotated measuring task is generated for the substrate.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for measuring structures (3) on a substrate (2) with a coordinate measuring machine (1), wherein the coordinate measuring machine (1) comprises at least one camera defining a measurement window, at least one illumination means, at least one measurement objective defining an optical axis, and a measurement table movable in the X-coordinate direction and in the Y-coordinate direction, with which the structure to be measured is moved into the optical axis of the measurement objective, and wherein a predefined measuring method is used for measuring at least one structure (3) on the substrate (2), characterized by the further steps of:

predefining a measuring method consisting of several processes, wherein a process is designed such that the measurement table is moved in the X-coordinate direction and/or in the Y-coordinate direction so that the at least one structure to be measured is within the measurement window of the camera, wherein the plurality of processes are linked with the coordinate system (1a) of the coordinate measuring machine (1);

measuring the position and/or width of a structure (3) on the substrate (2) for the substrate (2) with a first orientation of the coordinate system (2a) of the substrate (2) with respect to the coordinate system (1a) of the coordinate measuring machine (1) with the measurement window of the camera in a further process;

determining a deviation of at least one second orientation of the coordinate system (2a) of the substrate (2) from the first orientation; and measuring the position and/or width of a structure (3) on the substrate (2) with the measurement window of the camera, wherein the measurement window is positioned corresponding to the deviation of the first orientation from the at least second orientation such that, based on the detected second orientation of the substrate, the processes are changed for the substrate measured in the original orientation such that, on the substrate in the at least one other orientation, the same structure is measured at the same location of the structure and with the same measurement window.

2. The method of claim 1, characterized in that the first orientation of the substrate is 0° with respect to the coordinate system of the coordinate measuring machine.

3. The method of claim 1, characterized in that the second orientation of the substrate is 90°, 180° or 270° with respect to the coordinate system of the coordinate measuring machine.

4. The method of claim 1, characterized in that the at least one second orientation is set automatically.

5. The method of claim 4, characterized in that the automatically set orientation of the substrate is determined by detecting special markings and/or structures on the substrate.

6. The method of claim 1, characterized in that a means for automatically orienting a substrate is associated with the coordinate measuring machine, that the various automatically set orientations of the substrate are determined by a control and computing unit connected to the coordinate measuring machine.

7. The method of claim 1, characterized in that the substrate is a mask for the production of semiconductors or a wafer.

* * * * *